(12) United States Patent
Thannheimer

(10) Patent No.: US 10,974,645 B2
(45) Date of Patent: Apr. 13, 2021

(54) VEHICLE PANE WITH A COVERED LIGHTING DEVICE

(71) Applicant: Webasto SE, Stockdorf (DE)

(72) Inventor: Johannes Thannheimer, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 16/615,326

(22) PCT Filed: May 16, 2018

(86) PCT No.: PCT/EP2018/062815
§ 371 (c)(1),
(2) Date: Nov. 20, 2019

(87) PCT Pub. No.: WO2018/219657
PCT Pub. Date: Dec. 6, 2018

(65) Prior Publication Data
US 2020/0122637 A1 Apr. 23, 2020

(30) Foreign Application Priority Data

Jun. 2, 2017 (DE) ...................... 10 2017 005 281.6
Jun. 2, 2017 (DE) ...................... 20 2017 002 931.6

(51) Int. Cl.
*H01L 27/15* (2006.01)
*B60Q 3/64* (2017.01)
(Continued)

(52) U.S. Cl.
CPC .......... *B60Q 3/64* (2017.02); *B32B 17/10018* (2013.01); *B60J 7/043* (2013.01); *B60Q 3/208* (2017.02)

(58) Field of Classification Search
CPC .... B32B 17/10541; B60Q 3/208; B60Q 1/268
See application file for complete search history.

(56) References Cited

U.S. PATENT DOCUMENTS 8,829,539 B2* 9/2014 Kleo .................... G02B 6/0015
257/82
9,006,751 B2* 4/2015 Kleo .................... B60Q 3/208
257/82
(Continued)

FOREIGN PATENT DOCUMENTS

DE 10 2007 003 173 A1 6/2008
DE 10 2015 000 071 A1 7/2016

OTHER PUBLICATIONS

International Search Report for PCT/EP2018/062815 dated Jul. 25, 2018 and English Translation enclosed herewith (5 pages).

*Primary Examiner* — Andrew J Coughlin
(74) *Attorney, Agent, or Firm* — Fitch, Even, Tabin & Flannery, LLP

(57) ABSTRACT

A vehicle pane is disclosed which may have a film arranged on the pane inner side, with a lighting device, which is coupled to the film and which can radiate light into a lighting layer of the film, and with a screen-like cover covering the lighting device, wherein according to the invention the cover forms a fixed connection between a film portion of the film arranged further towards the center of the pane relative to the lighting device and a frame arranged further towards the outer edge of the pane relative to the lighting device or arranged along the edge of the pane.

11 Claims, 9 Drawing Sheets

(51) Int. Cl.
*B60Q 3/208* (2017.01)
*B32B 17/10* (2006.01)
*B60J 7/043* (2006.01)

(56) References Cited

U.S. PATENT DOCUMENTS

| | | | |
|---|---|---|---|
| 9,249,946 B2* | 2/2016 | Mulet | B32B 17/10541 |
| 9,403,477 B2* | 8/2016 | Richard | B60Q 1/268 |
| 2005/0001456 A1* | 1/2005 | Bohm | B32B 17/10495 |
| | | | 296/215 |
| 2009/0148642 A1* | 6/2009 | Mauser | B32B 17/10018 |
| | | | 428/38 |
| 2011/0267833 A1* | 11/2011 | Verrat-Debailleul | B60Q 3/208 |
| | | | 362/545 |
| 2012/0320621 A1* | 12/2012 | Kleo | B32B 17/10018 |
| | | | 362/558 |
| 2014/0002255 A1* | 1/2014 | Reuschel | B60Q 1/268 |
| | | | 340/438 |
| 2014/0204601 A1* | 7/2014 | Bauerle | B32B 17/10036 |
| | | | 362/511 |
| 2014/0362597 A1* | 12/2014 | Verrat-Debailleul | B32B 17/10541 |
| | | | 362/511 |
| 2015/0078020 A1* | 3/2015 | Verrat | B60Q 1/268 |
| | | | 362/509 |
| 2015/0247968 A1* | 9/2015 | Verrat-Debailleul | G02B 6/0076 |
| | | | 362/612 |
| 2018/0001751 A1 | 1/2018 | Thannheimer et al. | |

* cited by examiner

VEHICLE PANE WITH A COVERED LIGHTING DEVICE

CROSS-REFERENCE TO RELATED APPLICATIONS

This application is a U.S. national phase application filed under 35 U.S.C. § 371 of International Application No. PCT/EP2018/062815, filed May 16, 2018, designating the United States, which claims priority from German Patent Application No. 10 2017 005 281.6, filed Jun. 2, 2017, and German Patent Application No. 20 2017 002 931.6, filed Jun. 2, 2017, which are hereby incorporated herein by reference in their entirety for all purposes.

FIELD

The invention relates to a vehicle pane with a film arranged on the pane inner side, with a lighting device, which is coupled to the film and which can radiate light into a lighting layer of the film, and with a screen-like cover covering the lighting device.

BACKGROUND

A roof covering of a vehicle roof has been disclosed in DE 10 2015 000 071 A1, said covering comprising a pane, a lighting and anti-splinter layer arranged on the pane inner side, as well as a lighting device which can radiate light into the lighting and anti-splinter layer. A cover or screen covers the lighting device and shields scattered light if it exits from the light radiation into the lighting and anti-splinter layer. The screen is fastened to the inner side of the cover on either side adjacent to the lighting device.

SUMMARY

The object of the invention is to provide a vehicle pane, as mentioned in the introduction, which is improved with regard to the cover.

In the vehicle pane according to the invention, as mentioned in the introduction, this object is achieved by the cover forming a fixed connection between a film portion of the film arranged further toward the center of the pane relative to the lighting device and a frame arranged further toward the outer edge of the pane relative to the lighting device or arranged along the edge of the pane.

Advantageous embodiments of the invention are specified in the dependent claims.

The cover is a component with a sufficient level of strength that a fixed connection is always ensured between a film portion of the film arranged further toward the center of the pane relative to the lighting device and a frame arranged further toward the outer edge of the pane relative to the lighting device or arranged along the edge of the pane, in particular even in the case of excessive action of force on the pane, such as for example due to the impact of a vehicle occupant against the pane as a result of an accident or due to the external impact of an object, whereby the pane, which in particular is a glass pane, could break or splinter. The film, which in particular is a lighting and anti-splinter film with a high tear strength, secures the pane and in order to absorb tensile forces toward the pane edge the film is connected via the cover in a fixed and tension-resistant manner to the frame arranged on the edge side.

The positional information "further toward the center of the pane relative to the lighting device" specifies the region on the pane which, starting from the lighting device expediently arranged in a pane edge region, is located adjacent to the lighting device in the direction of the pane center. Conversely, the positional information "further toward the outer edge of the pane relative to the lighting device" denotes the region between the lighting device and the adjacent pane edge.

Expediently, such a frame is a pane frame which is attached to the pane or a frame of a vehicle opening of a vehicle structure or a vehicle roof to be closed by the pane and, in particular, is a reinforcement frame which is preferably made of metal. The attachment of the frame to the pane is carried out, for example, by applying foam consisting of polyurethane or the like onto or around said pane. The frame may extend along only one side edge of the pane, on two opposing side edges of a substantially rectangular pane or is formed in a peripheral manner on the pane and/or the pane edge.

In a preferred design, the cover contains a first or inner fastening portion, said cover being fastened thereto on the film portion of the film which is fixedly attached to the pane inner side, and a second or outer fastening portion which is fixedly attached to the frame or which represents a transition component, the cover transitioning thereon into the frame, in particular by means of an integral design of the cover with the frame. Expediently, the first fastening portion and/or the second fastening portion are planar fastening flanges but may also have a profiled design or shapes deviating therefrom which are suitable for a fixed connection and/or an integral design. The fastening of the cover to a pane where the frame is fixed to the pane may be already carried out during the production of the pane and after the lighting device has been attached, even before installation on a vehicle. Accordingly, in the case of a frame provided on the vehicle structure, the attachment of the cover may take place both after the installation of the pane and already during the production of the pane and/or the covering before installation, depending on the respective design.

The cover may be provided on the second or outer fastening portion, and in addition to the fastening on the frame, with a further connection or fastening, for example on the pane inner side.

The cover is preferably fastened via its fastening portions or fastening flanges by means of adhesive bonding, in particular by means of a double-sided adhesive strip. Such an adhesive strip having a sufficiently high adhesive force provides, after the curing period, a strength of the adhesive bond of approximately 35 to 40 N/cm with steel, approximately 28 to 32 N/cm with ABS and approximately greater than 28 N/cm with the film 6, for example. However, other types of fastening which provide sufficient strength may also be used.

The cover is formed, in particular, in the manner of an elongated half-shell and has, in particular, a high level of resistance to deformation which could cause a mutual displacement of the two fastening flanges away from one another. The cover is preferably produced from a plastics material such as a PC-ABS blend. The material thickness may, for example, be approximately 2.5 mm, wherein individual regions may be reinforced or thickened. However, other deformation-resistant materials, such as metals or composite materials, are also suitable.

The lighting device expediently extends along a pane edge of the pane and along a side edge of the film, wherein lighting devices may also be arranged on two opposing longitudinal sides of the pane. The lighting device is preferably arranged in a housing and a film edge of the film is coupled to the lighting device in the housing.

The pane is a pane of a roof covering arranged in a roof opening of a vehicle roof or is a fixed or movable pane of a roof module but may also be a side window or rear window of a vehicle, for example.

In a preferred design, the film arranged on the pane inner side is laminated or adhesively bonded via its central region to the pane inner side, but the respective edge portion remains unbonded. Thus after adhesively bonding the film, the film edge may be coupled in a simple manner to the lighting device and subsequently fixed thereto by means of the lighting device on the pane inner side. The unbonded edge portion of the film is thus not subsequently adhesively bonded to the pane inner side.

In a preferred design, it is provided that the film has an adhesive layer for adhesive bonding to the pane inner side, which adhesive layer is covered by an overall covering layer before the adhesive bonding of the film. The overall covering layer may be subdivided into the edge covering layer and into a main covering layer by cutting on a cutting line. The film is adhesively bonded to the pane inner side by means of the central adhesive layer which is exposed after the main covering layer has been removed. The edge portions of the film remain unbonded.

The cutting or subdivision of the overall covering layer may be carried out by means of a cutting tool without damaging the adhesive layer. Such a cutting tool, for example, is a laser cutting device, a cutting knife, a rolling knife or a plotter with a cutting device.

A covering film which forms the overall covering layer may be cut on the cutting line in a continuous or discontinuous manner. In any case, a light-guiding film layer which is located therebelow should not be damaged. Discontinuous cutting is carried out such that the overall covering layer may be cut in a simple manner.

For improved splinter protection the film may have a multilayered film layer composite. The multilayered film layer composite preferably contains at least two clear PET films adhesively bonded together.

The lighting device may preferably be an LED-light device comprising a number of LEDs which are received in a housing. The housing is expediently attached to the pane inner side or to a roof covering frame or the like. The attachment is implemented, for example, by retaining clips which are adhesively bonded to the pane inner side.

The film and/or the lighting and anti-splinter layer is preferably applied onto the pane in a lamination method at room temperature. Such a lamination method is disclosed, for example, in DE 10 2007 003 173 A1. The lighting and anti-splinter layer and/or the film or PET film is expediently formed with openings or perforations on two opposing sides of the roof covering. A PU foam applied around the roof covering or an adhesive bead penetrates through the openings or perforations and additionally reinforces the fastening of the layer or film to a roof covering inner panel or, in the case of fixed glazing, to the vehicle frame.

The invention is described hereinafter in more detail by means of exemplary embodiments of vehicle panes according to the invention, with reference to the drawings, in which:

BRIEF DESCRIPTIONS OF THE DRAWINGS

DETAILED DESCRIPTION

Figure 4:
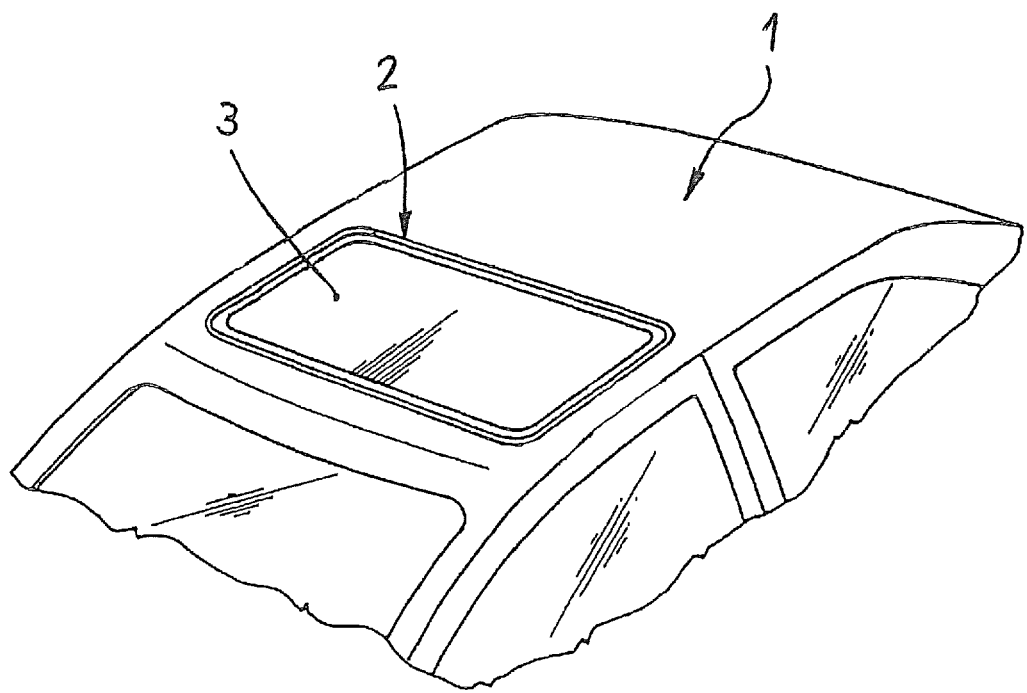
FIG. 4 shows in a perspective view a vehicle roof with a roof covering comprising a pane.

A vehicle, such as for example a passenger motor vehicle, has a vehicle roof 1 with a roof opening 2 (see FIG. 4) in which a roof covering 3 is arranged. The roof covering 3 may be fixedly attached to the vehicle roof 1 or may be movably mounted as part of an openable roof, such as for example a sliding roof or a spoiler roof or the like, by means of a bearing device. The roof covering 3 contains a pane 4 which is produced, for example, from plastics and in particular from glass, and which is also denoted as the vehicle pane. The pane 4 is provided with a film 6 on its pane inner side 5 which forms the inner side or underside of the roof covering 3.

The film 6 is constructed, in particular, from a plurality of film layers or a film layer composite 7 and on its side provided for adhesive bonding to the pane 4 contains an adhesive layer 8, the thickness thereof for example being approximately 0.020 mm, and which contains styrene-co-polymer, rubber, acrylate, epoxy resin, silicone or acrylic resin, for example, as adhesive. A liner or a covering film 9 is attached to the adhesive layer 8 as a cover, which represents an overall covering layer 10 of the entire film 6 in its delivered state before the film 6 is applied to the pane 4.

Figure 3:
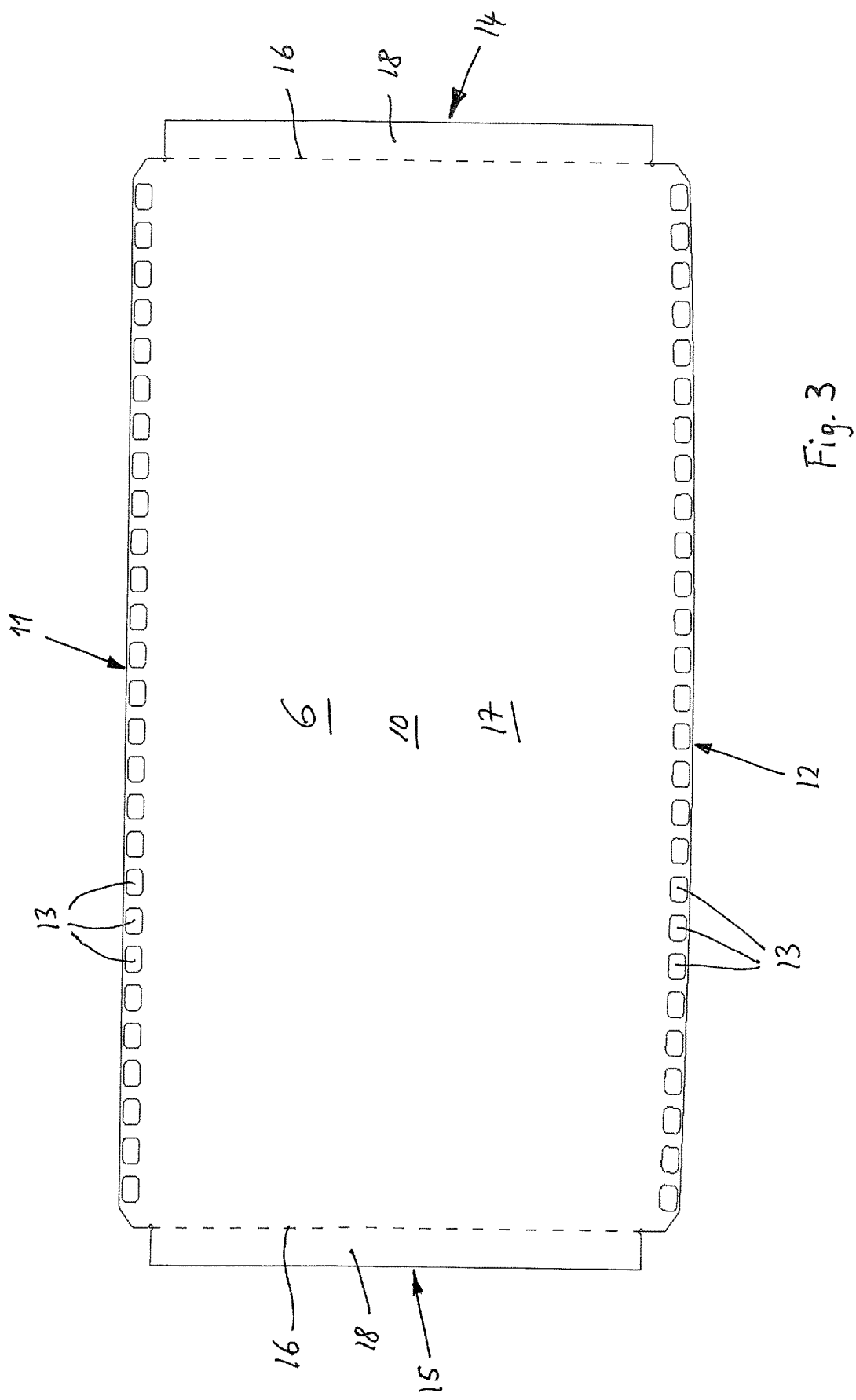
FIG. 3 shows in a plan view the film which is attachable to a pane inner side.

On its front edge 11 (see FIG. 3) and on its rear edge 12 which are assigned to the associated front edge and/or the rear edge of the roof covering 3 in its arrangement on the vehicle roof 1, the film 6 may expediently be formed with a series of openings 13 or perforations along these edges 11 and 12, through which, for example when applying foam around the roof covering edge or adhesively bonding the roof covering 3 with the film 6 attached thereto, the film 6 may be additionally securely fastened to the pane inner side 5 and optionally to a frame-like roof covering inner panel or, in the case of fixed glazing, to a roof cutout frame of the vehicle body surrounding the roof opening 2.

Parallel to the right-hand side edge 14 and to the left-hand side edge 15 of the film 6, the liner and/or the covering film 9 has been cut along one respective cutting line 16, for example by means of a cutter or knife or a laser cutting device, so that the overall covering layer 10 is subdivided into a central, large main covering layer 17 and two lateral narrow strip-shaped edge covering layers 18. By cutting the covering film 9, the overall covering layer 10 may be removed from the film 6 and/or the adhesive layer 8 and at the same time detached along the respective cutting line 16 from the edge covering layer 18 remaining on the film 6. Thus the film 6 is ready to be adhesively bonded to the pane inner side 5 or laminated thereon. The adhesive bonding takes place in the uncovered central region whilst the two lateral edge portions 26 of the film 6 which are congruent with the edge covering layers 18 remain unbonded.

Figure 1:
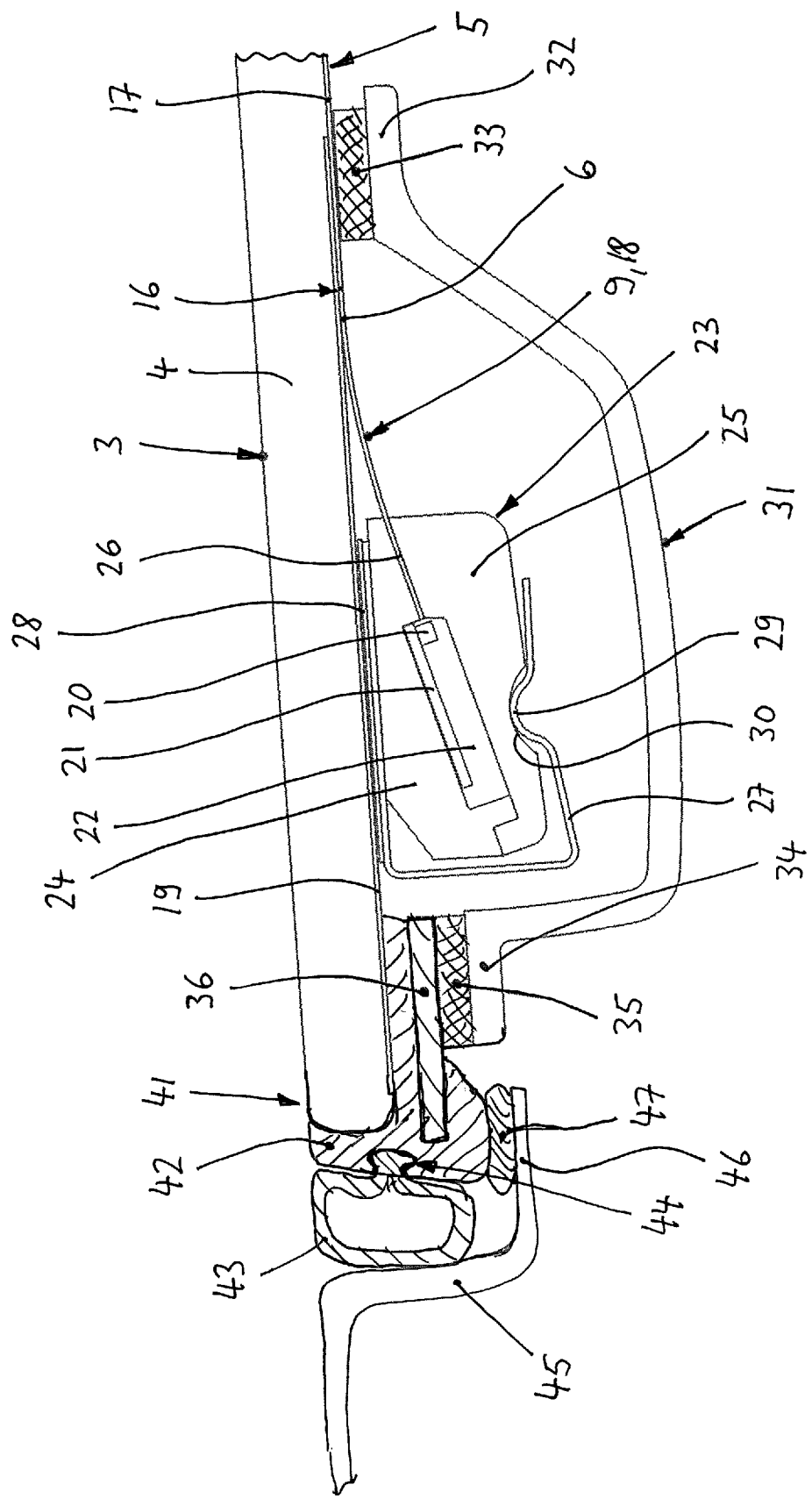
FIG. 1 shows in a cross-sectional view an edge region of a pane of a roof covering which is fixedly attached to a vehicle roof, with a film arranged on the lower side of the pane or roof covering and with a lighting device covered by a cover, with lateral coupling-in of light into the film.

In FIG. 1 a cross section of the pane 4 in its lateral edge region is shown. A covering layer 19 which is colored black, such as for example a glass frit or primer layer, is applied onto the pane inner side 5. The film 6 is adhesively bonded on the pane inner side 5 in its central region up to the cutting line 16, which is located in the region of the covering layer 19. To the side beyond the cutting line 16 the edge covering layer 18 covers the film 6 in its unbonded edge portion 26 which is bent back from the pane inner side 5. The film 6 is coupled on its side edge 15 to LEDs of an LED-light device or lighting device 20. The LEDs are located on an LED-carrier 21, for example a printed circuit board, which is received in an interior 22 of a housing 23 and is fastened with the housing 23 to the pane inner side 5. The housing 23 contains, for example, a housing upper part 24, the LED-carrier 21 being attached on the inner side thereof and a housing lower part 25 which is connected to the housing upper part 24, wherein between the two housing parts 24 and 25 the edge portion 26 of the film 6 is guided as far as the LEDs and is retained or fixedly clamped such that the side edge 14 or the edge is located in the immediate vicinity of the LEDs and thus is able to radiate the light of the LEDs into the film 6. The film and/or the layers thereof are formed from light-conducting material and may radiate light which has been irradiated in the film 6 below the pane 4 downwardly toward the vehicle interior, enabling illumination or a lighting arrangement.

The housing 23 with the two housing halves or housing parts 24 and 25 is, for example, an elongated component and extends over the length of the side edge 15, 16 of the film 6 in the side edge region of the roof covering 3. The housing 23 with the LED-light device or lighting device 20 received therein is fastened by means of a plurality of clips 27 to the pane inner side 5 or adhesively bonded thereto, for example by means of a double-sided adhesive strip 28. The clips 27 encompass the housing 23 from the side edge inwards and retain the housing 23 and/or the lower housing part 25 by means of a bulge 29 which engages in an associated recess 30 on the lower housing part 25 by being subjected to spring force. The clamping force of the clips 27 is able to press the two housing parts 24 and fixedly together so that an additional connecting device for the two housing parts 24 and 25 is not required. On the other hand, the two housing halves may also be connected together by plug connections, latching, clamping or adhesive bonding.

A covering 31 forming a screen extends over the housing 23 and the unbonded edge portion 26 of the film 6. The covering 31 is adhesively bonded to the film 6 via an inner fastening flange 32 by means of an adhesive strip 33 and covers the inner edge of the covering layer 19. An outer fastening flange 34 of the covering 31 is connected via an adhesive strip 35 to the pane 4 or to a frame 36 which, for example, forms a pane frame or reinforcement frame.

Figure 2:
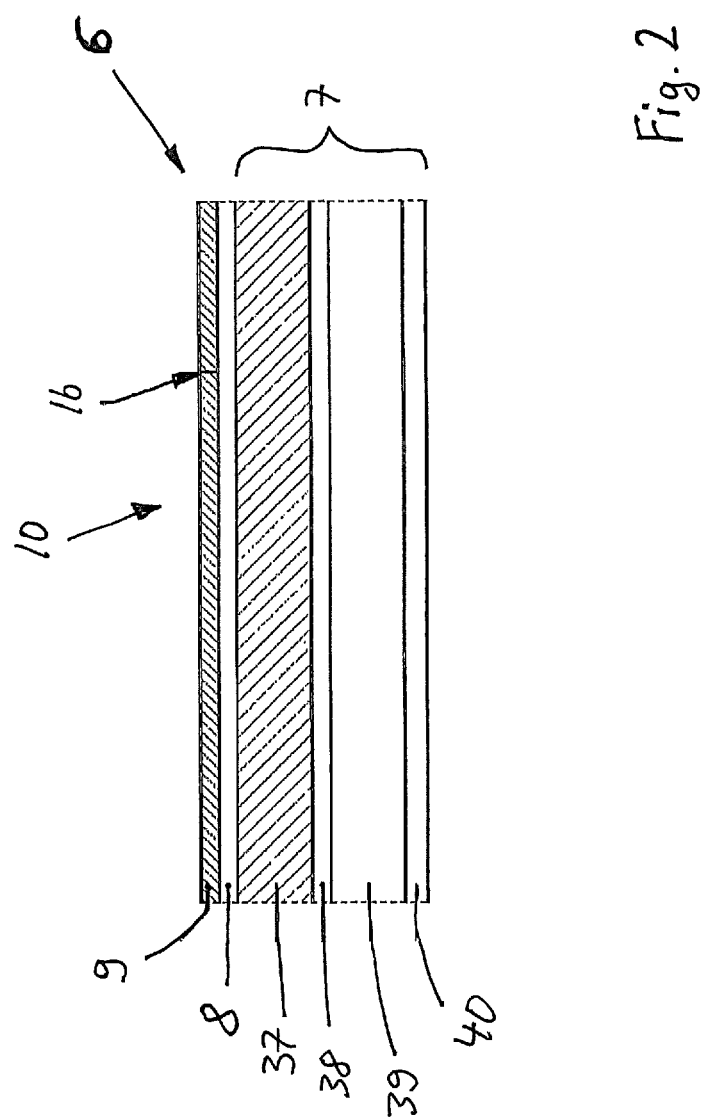
FIG. 2 shows in a cross-sectional view the film which is attachable to a pane inner side.

FIG. 2 shows the construction of the film 6. The film layer composite 7 contains, for example, an upper clear PET film 37 (PET polyethylene terephthalate) with a thickness of for example 0.1 mm, a lower clear PET film 39 having a thickness of for example 0.1 mm adhesively bonded to the upper PET film 37 by means of an adhesive layer 38 and a hard coating 40 applied thereto. Such a film 6 with a double-layered film composite provides improved splinter protection if the pane 4 shatters in the event of an accident. The LEDs radiate light into the two clear PET films 37 and 39 which conduct the light over the entire film surface so that the film 6 may form a luminous element over its entire surface. The film 6 thus forms a lighting and anti-splinter layer.

The covering film 9 preferably has a thickness of approximately 0.050 mm and the thickness of the adhesive layer 8 is approximately 0.020 mm.

The cutting of the covering film 9 on the respective cutting line 16 may be continuous or discontinuous but in any case it permits a simple detachment of the covering film 9 along the cutting line 16.

The clips 27 may be attached to the pane inner side 5 before the housing 23 is attached to the edge of the film 6, and then clamped in the clips 27 or said clips are initially clipped to the housing 23 after the film 6 has been secured thereto, and subsequently fastened to the pane inner side 5. A plurality of clips 27 may also be formed as an integral positioning and retaining strip for the housing 23.

The frame 36 is fastened below the pane side edge 41 by means of a foam 42 consisting of polyurethane integrally formed on or around the pane 4 on the edge side and is expediently formed as a peripheral reinforcing frame on the pane 4. A seal 43 is fastened, for example, by means of a retaining groove 44 formed in the foam 42 applied onto or around the pane, or by means of adhesive bonding to the foam 42 applied onto or around the pane, and seals the roof covering 3 on the edge side relative to a roof frame 45 which contains a roof frame flange 46 defining or surrounding the roof opening 2. The pane 4 and/or the roof covering 3 is fastened and/or adhesively bonded by means of an adhesive bead 47 to the roof frame flange 46.

The covering 31 is formed in the manner of a half-shell and extends over the length of the housing of the lighting device. In the case of excessive force applied onto the pane 4—such as for example due to the impact of a vehicle occupant against the pane 4 as a result of an accident or due to the external impact of an object—if the pane 4, which in particular is formed as a glass pane, breaks and splinters, the film 6 fixedly bonded to the pane 4 prevents the splintering of the pane 4 into individual parts. A certain deformation or displacement of the pane 4 results in the film 6 being subjected to a tensile force away from the pane side edge 41 toward the center of the pane. This tensile force is transmitted from the film 6 via the inner fastening flange 32 of the covering 31, which is connected or adhesively bonded to the film 6 in the region of its main covering layer 17 which is fixedly bonded to the pane inner side 5, to the outer fastening flange 34 and thus to the stiff frame 36, and safely supported thereon and thus on the roof frame 45. The covering 31 thus has a sufficiently high level of strength against deformation that the spacing between the inner fastening flange 32 and the outer fastening flange 34 remains substantially constant even when loaded in such a manner.

Figure 5:
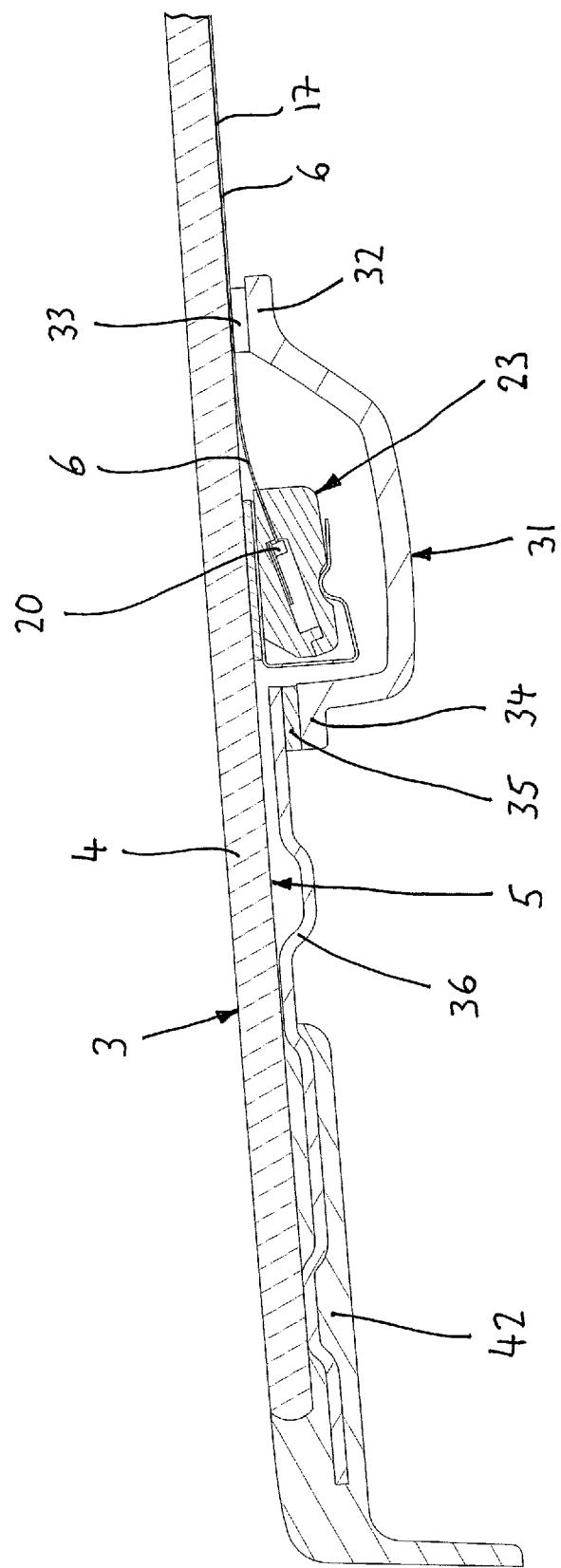
FIG. 5 shows in a cross-sectional view an edge region of a pane of a roof covering to be movably mounted on a vehicle roof with a cover arranged on the underside of the roof covering.

FIG. 5 shows an embodiment, which is modified relative to the roof covering 3 and/or the pane 4 of FIG. 1, of a glass roof covering 3 to be movably mounted on a vehicle roof. The film 6 together with the lighting device 20 and the covering 31 which covers the lighting device 20 are also attached to the pane 4. The covering 31 is adhesively bonded with its outer fastening flange 34 to the frame 36 which is formed as a roof covering inner panel, which in cross section also extends as far as the center of the roof covering, and which is fastened to the pane 4 by means of the foam 42 applied onto or around the pane.

Figure 6:
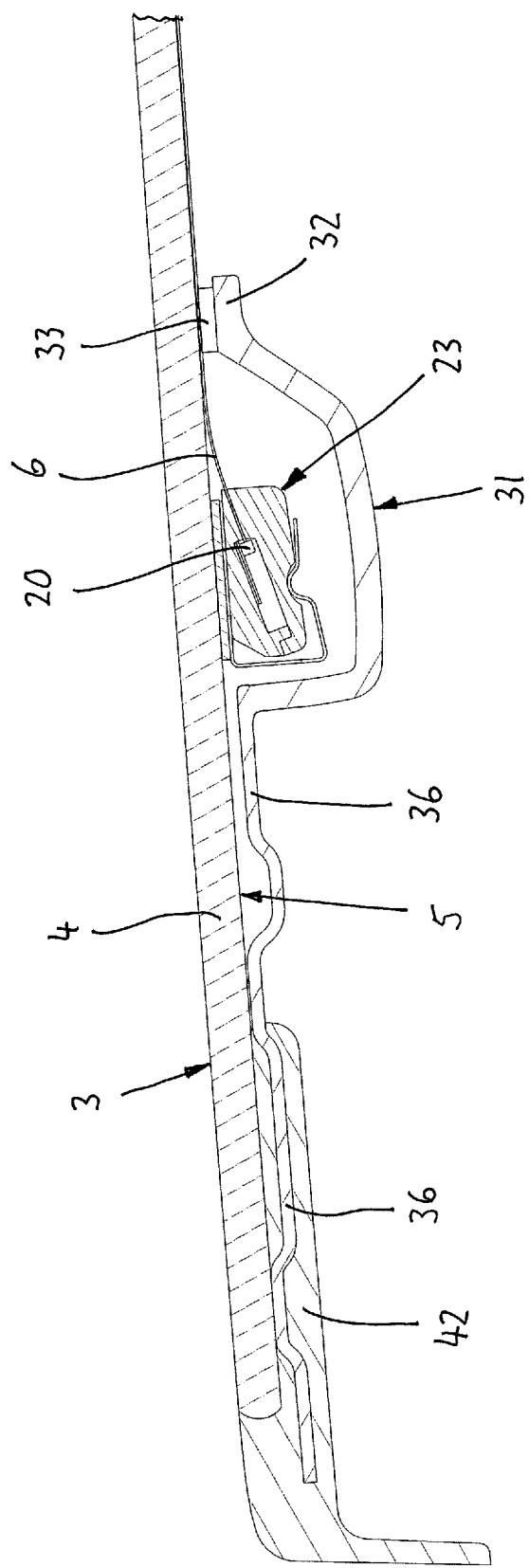
FIG. 6 shows in a cross-sectional view according to FIG. 5 an edge region of a pane of a roof covering to be movably mounted on a vehicle roof with a modified cover.

FIG. 6 shows an embodiment which is modified relative to the roof covering 3 of FIG. 5, in which the covering on its outer fastening flange 34 transitions integrally into the frame 36. The frame 36 is fastened by means of the foam 42 applied onto or around the pane 4, wherein the covering 31 which is joined to the frame 36 is adhesively bonded on its inner fastening flange to the pane inner side 5. The frame 36 and the covering 31 may be produced from the same material, such as plastics or metal. On the other hand, the frame 36 may be formed from metal and the covering 31 which is formed from a different material, such as for example plastics, may be connected fixedly to the frame 36 by means of a joining process before the frame 36 together with the covering 31 are fixedly connected to the pane 4 as a unit.

Figure 7:
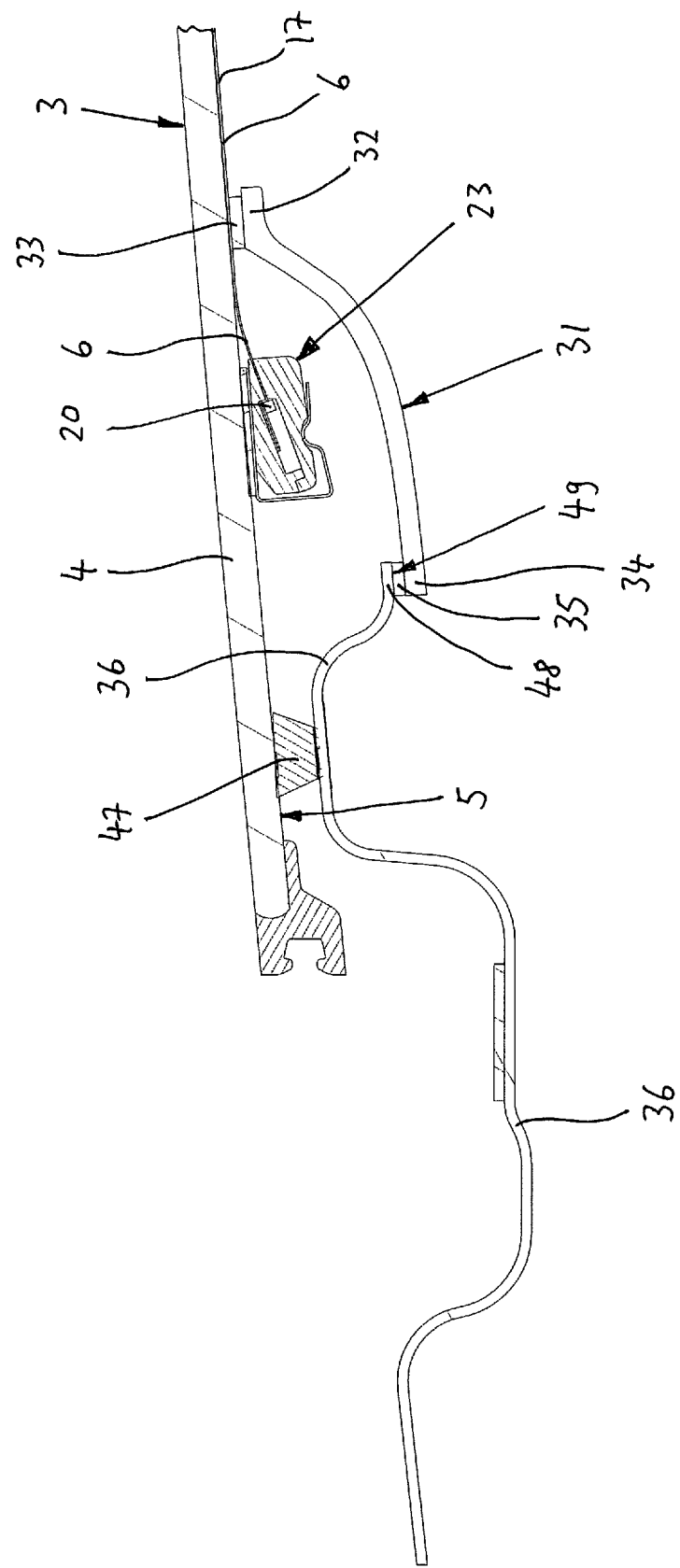
FIG. 7 shows in a cross-sectional view a further embodiment of a pane of a roof covering fixedly attached to a vehicle roof with a modified cover.

FIG. 7 shows a further embodiment of a pane 4 of a glass roof covering 3 which is modified relative to the roof covering 3 with the pane 4 shown in FIG. 1 and which is fixedly attached to a frame 36, which forms a vehicle roof frame, roof module frame or any other roof-side auxiliary frame, by means of the adhesive bead 47, in particular to a free frame edge portion 48 which contains a fastening surface 49 on the underside for the adhesive strip 35 for securely bonding the outer fastening flange 34 of the covering 31.

Figure 8:
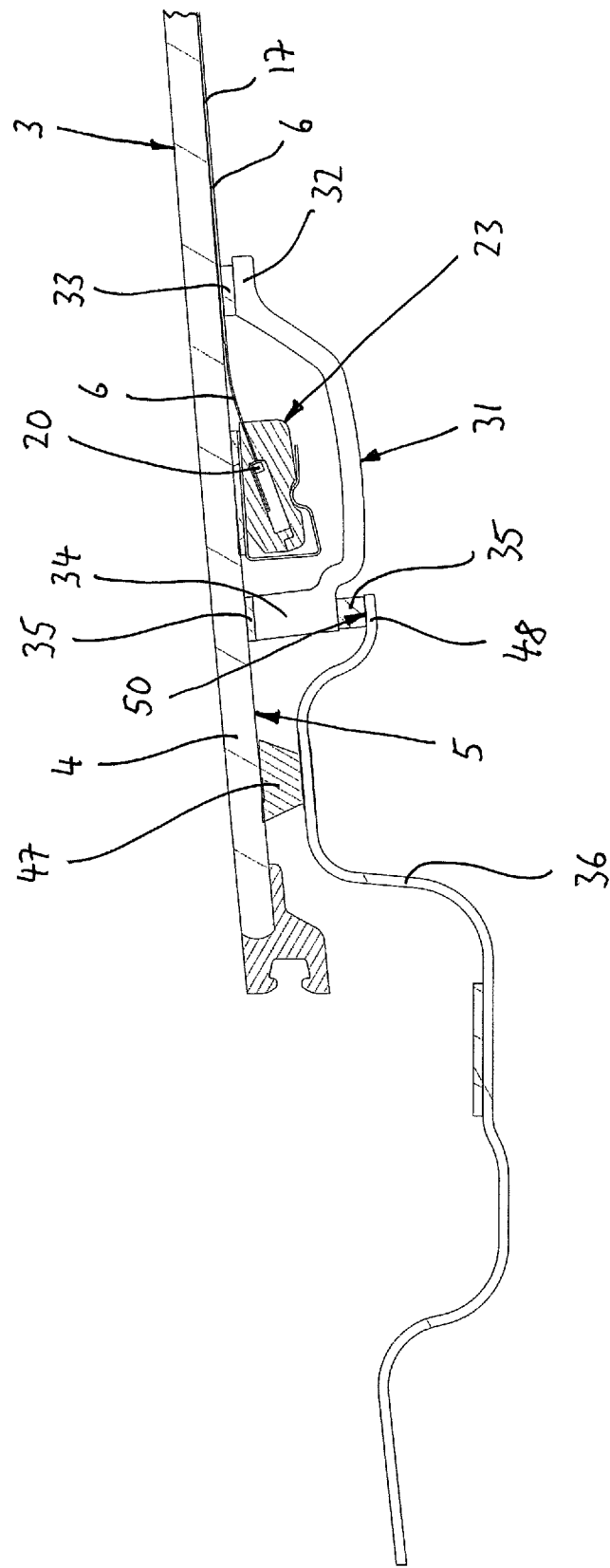
FIG. 8 shows in a cross-sectional view according to FIG. 7 a further embodiment of a pane of a roof covering fixedly attached to a vehicle roof with a modified cover.

FIG. 8 shows an embodiment which is modified relative to the roof covering 3 shown in FIG. 7, in which the covering 31 has an outer fastening flange 34 which, for fastening further toward the outer edge of the pane relative to the lighting device 20 or along the edge of the pane, is fastened both to a fastening surface 50 on the upper face of the free frame edge portion 48 of the frame 36 and to the roof covering inner side 5, in each case by means of adhesive bonding, such as for example by means of an adhesive strip 35. This double fastening or adhesive bonding provides a support of the covering 31 which is very resistant to deformation.

Figure 9:
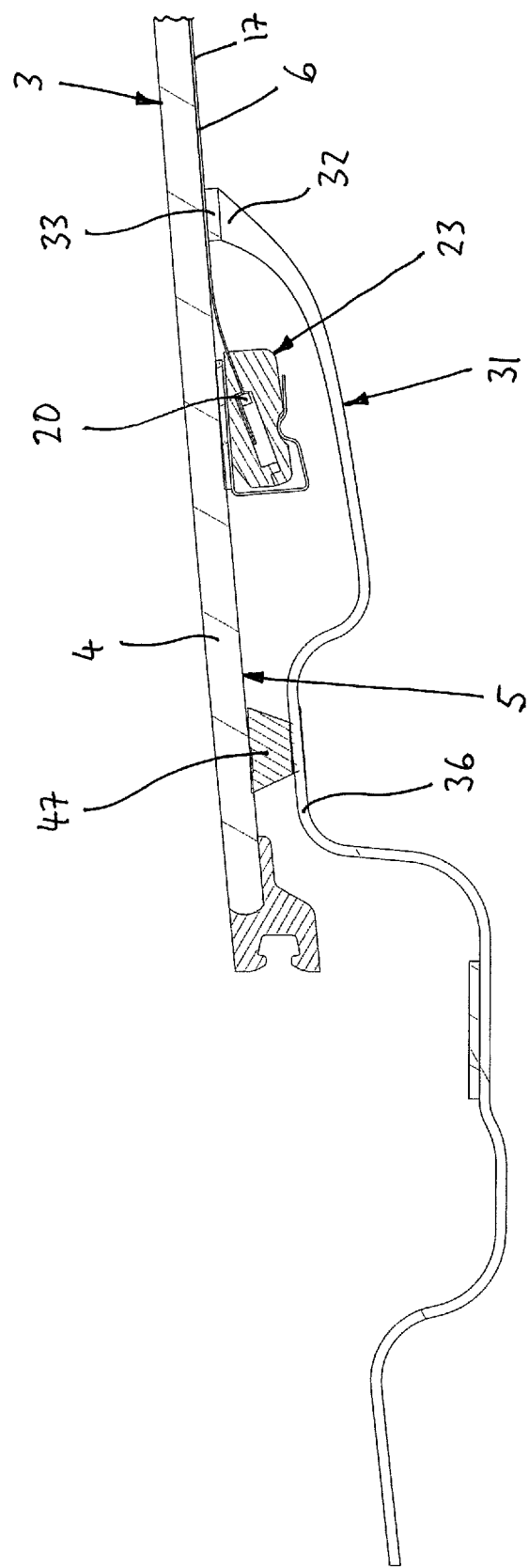
FIG. 9 shows in a cross-sectional view according to FIG. 7 a further embodiment of a pane of a roof covering fixedly attached to a vehicle roof with a modified cover.

FIG. 9 shows a further embodiment which is modified relative to the roof coverings 3 shown in FIGS. 7 and 8, in which the roof covering 3 on the roof side is fixedly attached to the frame 36 and the cover 31 as an extension of the frame 36 is integrally formed therewith (comparable with the embodiment of FIG. 6) and accordingly only an adhesively bonded connection of the inner fastening flange 32 to the film 5 attached to the roof covering inner side 5 by means of the adhesive strip 33 is required.

The individual features of the invention disclosed in the description and by means of the exemplary embodiments, and in the figures, may be combined in any technically expedient arrangements and designs with the subject according to the invention in its general form.

LIST OF REFERENCE NUMERALS

1 Vehicle roof
2 Roof opening
3 Roof covering
4 Pane
5 Pane inner side
6 Film
7 Film layer composite
8 Adhesive layer
9 Covering film
10 Overall covering layer
11 Front edge
12 Rear edge
13 Opening
14 Right-hand side edge
15 Left-hand side edge
16 Cutting line
17 Main covering layer
18 Edge covering layer
19 Covering layer
20 Lighting device
21 LED-carrier
22 Interior
23 Housing
24 Housing upper part
25 Housing lower part
26 Edge portion
27 Clips
28 Adhesive strip
29 Bulge
30 Recess
31 Cover
32 Inner fastening flange
33 Adhesive strip
34 Outer fastening flange
35 Adhesive strip
36 Frame
37 PET film
38 Adhesive layer
39 PET film
40 Hard coating
41 Pane side edge
42 Foam applied onto or around pane
43 Seal
44 Retaining groove
45 Roof frame
46 Roof frame flange
47 Adhesive bead
48 Frame edge portion
49 Fastening surface
50 Fastening surface

The invention claimed is:

1. A vehicle pane comprising:
    a film arranged on the pane inner side, with a lighting device, which is coupled to the film and which can radiate light into a lighting layer of the film, and with a screen-like cover covering the lighting device,
    wherein the cover forms a fixed connection between a film portion of the film arranged further toward the center of the pane relative to the lighting device and a frame,
    wherein the frame is a stationary frame of a vehicle opening of a vehicle structure, or a vehicle roof to be closed by the pane and wherein the frame is arranged further toward the outer edge of the pane relative to the lighting device or arranged along the edge of the pane,
    wherein the cover has an inner fastening portion, the cover being fastened thereto on the film portion of the film which is fixedly attached to the pane inner side and the cover having an outer fastening portion which is fixedly attached to the frame;
    wherein the outer fastening portion is also fixedly attached directly to the pane inner side via an adhesive, and
    wherein the outer fastening portion is fixedly attached between the frame and the pane inner side.

2. The vehicle pane as claimed in claim 1, wherein the film is a lighting and anti-splinter film.

3. The vehicle pane as claimed in claim 1, wherein at least one of the inner fastening portion and the outer fastening portion are planar fastening flanges.

4. The vehicle pane as claimed in claim 1, wherein the cover is fastened by an adhesive bonding.

5. The vehicle pane as claimed in claim 4, wherein the adhesive bonding is a double-sided adhesive strip.

6. The vehicle pane as claimed in claim 1, wherein the cover is half-shell-shaped.

7. The vehicle pane as claimed in claim 1, wherein the lighting device extends along a pane edge of the pane and along a side edge of the film.

8. The vehicle pane as claimed in claim 1, the lighting device is arranged in a housing and in that a film edge of the film is coupled to the lighting device in the housing.

9. The vehicle pane as claimed in claim 1, wherein the pane is a pane of a roof covering arranged in one of a roof opening, a vehicle roof, or a fixed or movable pane of a roof module.

10. The vehicle pane as claimed in claim 1, which adhesive layer is covered by an overall covering layer before the adhesive bonding of the film, in that the overall covering layer is subdivided into the edge covering layer and into a main covering layer by cutting on a cutting line and in that the film is adhesively bonded to the pane inner side by the adhesive layer which is exposed after the main covering layer has been removed.

11. The vehicle pane as claimed in claim 1, wherein the pane frame is a reinforcement frame.

* * * * *